United States Patent [19]
Konder et al.

[11] Patent Number: 5,748,322
[45] Date of Patent: May 5, 1998

[54] METHOD AND APPARATUS FOR QUALITY INSPECTION OR MOLDED OF FORMED ARTICLES

[75] Inventors: Wolfgang Konder, Trier; Heinz-Peter Wollscheid, Gusterath, both of Germany

[73] Assignee: Laeis + Bucher GmbH, Trier, Germany

[21] Appl. No.: 541,556

[22] Filed: Oct. 10, 1995

[30] Foreign Application Priority Data

Oct. 10, 1994 [DE] Germany ............................ 9416307 U
Mar. 31, 1995 [DE] Germany ......................... 195 12 188.0

[51] Int. Cl.$^6$ ................................................. G01B 11/00
[52] U.S. Cl. ........................ 356/394; 356/237; 250/223 R
[58] Field of Search ............................. 356/371, 375, 356/376, 394, 398, 237, 384, 338, 335, 336; 250/223 R

[56] References Cited

U.S. PATENT DOCUMENTS

| | | |
|---|---|---|
| 4,095,925 | 6/1978 | Cruzen et al. |
| 4,541,722 | 9/1985 | Jenks ........................ 356/376 |
| 5,129,010 | 7/1992 | Higuchi et al. ............ 356/376 |
| 5,305,080 | 4/1994 | Lee et al. .................. 356/237 |

FOREIGN PATENT DOCUMENTS

| | | |
|---|---|---|
| 0 341 849 | 11/1989 | European Pat. Off. |
| 0343033A1 | 11/1989 | European Pat. Off. |
| 0657260A1 | 12/1994 | European Pat. Off. |
| 2 535 451 | 10/1982 | France |
| 2264247 | 7/1974 | Germany |
| 2514930A1 | 10/1976 | Germany |
| 28 09 879 | 3/1977 | Germany |
| 3523411A1 | 2/1987 | Germany |
| 3530681A1 | 3/1987 | Germany |
| 3930224A1 | 3/1991 | Germany |
| 3934528A1 | 4/1991 | Germany |
| 4037383A1 | 5/1992 | Germany |
| 4200801A1 | 8/1993 | Germany |
| 89 06782 | 7/1989 | WIPO |

*Primary Examiner*—Hoa Q. Pham
*Attorney, Agent, or Firm*—Jacobson, Price, Holman & Stern, PLLC

[57] ABSTRACT

A method and an apparatus for conducting quality inspection of molded/formed articles (2) produced in a molding or forming machine which enables automation of the inspection by sensing surface coordinates using an optical triangulation sensor moved along a suitable sensing path (5), wherein spatial coordinate values of the surface of the article (2) obtained in the course of the movement of the sensor along the sensing path (5) are used to generate actual dimensional parameters which are compared with dimensional parameters determined for the prescribed desired dimensional form of the article, and the quality of the article (2) is evaluated based on the results of the comparisons.

14 Claims, 5 Drawing Sheets

METHOD AND APPARATUS FOR QUALITY INSPECTION OR MOLDED OF FORMED ARTICLES

BACKGROUND OF THE INVENTION

The invention relates to a method of quality inspection of molded or formed articles produced in a molding or forming machine, particularly a molding press for granular compositions, pursuant to a prescribed desired dimensional form, wherewith at least one actual dimensional parameter of the actual article is compared with a corresponding dimensional parameter of the desired configuration for said article, whereby the quality of the article is evaluated.

The invention also relates to an apparatus for quality inspection of molded or formed articles produced in a molding or forming machine, particularly a molding press for granular compositions, pursuant to a prescribed desired dimensional form, said apparatus comprised of means of evaluating the quality of the article by comparing at least one actual dimensional quantity or parameter of the article with a corresponding desired dimensional quantity or parameter of the desired form.

Such quality inspection tests the dimensional (form) accuracy of the manufactured molded/formed articles, i.e. the degree to which the actual form of the articles corresponds to the prescribed desired form. In particular, in the manufacture of molded articles by dry pressing of compositions which are introduced to the molding press in a flowable granular state, a problem is posed by the fact that the characteristics of the composition supplied, e.g. the particle size or particle size distribution, are not uniform over time, giving rise to fluctuations in characteristics of the molded/formed articles, particularly such characteristics as weight, particle size distribution, density, density distribution, and dimensions. Also, when employing molding presses, in time some of the composition to be pressed will tend to adhere to one of the press elements (e.g. a die), leading to irregularities in the surface of the molded articles (so-called "adhesion residues" or "bake-ons").

These phenomena are counter to the requirements imposed by the consumers of the articles, namely that the articles have uniform and consistent characteristics, particularly concerning dimensional (form) accuracy. The dimensional accuracy of an article bounded by planar surfaces can be determined by measurements of the linear dimensions (height, width, length, angle included by intersecting surfaces, course of edges, roughness, and deviation of surfaces from flatness (bulge or sag). In the case of molded/formed articles having curved bounding surfaces, other parameters may be involved, such as radii of curvature and the like. In addition, particularly with ceramic molded articles, there may be a requirement of uniform and consistent density, and, especially, uniform particle size distribution throughout the body of the article.

SUMMARY OF THE INVENTION

The underlying problem solved by the present invention is to devise a method and an apparatus of the type described supra, which method and apparatus enable automatic, rapid, reliable inspection of molded/formed articles for accuracy of form.

The method part of this problem is solved according to the invention in that the molded/formed article is sensed at surface locations suitable for determining the actual dimensional parameter corresponding to the desired dimensional parameter, whereby an actual data signal is generated which represents the actual dimensional quantity or parameter which is to be compared with the desired dimensional quantity or parameter, said desired quantity or parameter being represented by a desired-data signal.

The inventive method exploits the fact that, depending on the tolerance requirement, the accuracy of form of the molded/formed articles can be described by deviations from suitably selected desired dimensional parameters of the desired form of the article, wherewith the corresponding actual dimensional parameters of the actual form of the article can be determined by sensing suitable surface locations on the molded/formed article. If, e.g., one selects and prescribes a desired parameter consisting of the longitudinal dimensions of the molded/formed article between two edges of said article, it is sufficient to sense the molded/formed article in a certain neighborhood of the expected positions of said edges which expected positions are based on their positions on the desired form; thereby the actual positions of the edges are measured; and the value of the actual dimensional parameter will then be determined from the distance (s) between said actual positions of the edges. As another example, if a maximum value of the mean surface roughness is prescribed, one needs to sense a sufficient number of locations on the surface to provide a surface roughness profile, whereby a mean actual roughness value can be derived and used as the actual dimensional parameter. The corresponding desired-data signal representing the prescribed desired dimensional parameter is then compared with the actual-data signal representing the actual dimensional parameter, enabling automatic evaluation of the quality of the molded/formed article.

According to a preferred embodiment of the inventive method, the sensing of the molded/formed article is accomplished by at least one measuring light beam which is moved through a sensing path, which path may be prescribed and will depend on the desired shape and the actual dimensional quantities to be measured in the inspection, wherewith a spatial coordinate value in the direction of the measuring light beam will be obtained from the measuring light beam via the back-scattered light therefrom, from the back-scattering surface location on said article, by triangulation means, wherewith the spatial position of the surface location in question is completely defined in three dimensions by said coordinate and the coordinates of the measuring light beam along the sensing path.

The use of the measuring light beam avoids the use of contact measuring means. It has also been found that even very low-contrast structures on the surface of the molded/formed article can be reliably determined using distance measurement which depends on triangulation between the measuring light beam and the back-reflected light. Further, the measuring light beam, which may be in the form of, e.g., an IR laser beam, can be concentrated into a very small cross section capable of resolving even very fine surface structural features. The triangulation directly yields the distance to the back-scattering surface location of the article, in the direction of the measuring light beam incident on the article. A complete description of the spatial location of the surface locus being examined is provided by the coordinate in the direction of the light beam, plus the coordinates describing the irradiating path of said light beam. In this way, one can determine an accurate representation of the surface contour of the molded/formed article at all locations thereof which are engaged by the measuring light beam in the sensing path, and thereby the "actual dimensional parameter" can be derived.

Frequently, the desired form of the molded/formed article will be delimited by regular surface elements, e.g. planar surfaces, cylindrical surfaces, or the like, which elements meet at at least one edge at a nonzero angle. In such a case, preferably, it is provided according to the invention that the sensing path of movement of the measuring light beam extends transversely across said edge so as to traverse said edge. By means of the triangulation, the change in distance along the measuring light beam which occurs each time the measuring light beam traverses the edge can be detected with high precision, and thus the position of the edge can be accurately determined. The number of measuring points at which the measuring light beam transversely traverses the edge is selected by suitably configuring the sensing path, taking into account the course of the edge in the desired form and the desired precision. If, e.g., the edge configuration prescribed by the desired form is a straight line, the measuring light beam will be moved so as to transversely traverse the edge in a plurality of parallel sensing movements corresponding to a plurality of points of said edge. In the case of an edge with the configuration of a circular arc, it is undoubtedly more advantageous to move the measuring light beam in a radial trace over the edge.

The spatial positions of the surface locations provided by the sensing may be used directly as actual dimensional quantities for comparison with the corresponding desired dimensional quantities. However, it is frequently advantageous to derive "actual dimensional parameters" based on a plurality (some or all) of the spatial positions determined, wherewith said "actual dimensional parameters" can be readily compared with corresponding dimensional parameters of the desired article form. In this connection, according to an advantageous embodiment of the inventive method, a best-fit curve is determined for a plurality of values describing the spatial positions of surface elements, and said curve is employed to provide actual dimensional parameters (in the context of the above description) for comparison with the desired dimensional parameters defined by a corresponding "desired curve" fitted to points on the desired form. The thus established best-fit actual measurement curve (or surface) enables a particular facile comparison with the corresponding desired dimensional curve (or surface) In particular, one can use the deviation between the actual and desired curve (or surface) to define a measure of bulges (or depressions) of large areal extent, in the actual form with respect to the desired form. Further, the surface roughness with respect to the best-fit actual measurement curve (or surface) can be determined from the individual deviations of measured location coordinates in relation to corresponding locations on the best-fit curve (or surface).

The apparatus part of the underlying problem of the present invention is solved by an apparatus of the type described supra, wherein, according to the invention, the evaluation means comprise a device which provides a desired-data signal which represents the desired dimensional parameter, and a device for sensing the molded or formed article, and for providing an actual-data signal representing an actual dimensional parameter corresponding to the desired dimensional parameter.

In correspondence with the above-described refinement of the inventive method, in the inventive apparatus the sensing device has at least one triangulation sensor which is translationally movable along a sensing path which path is prescribable and depends on the desired form and the actual dimensional quantities (and parameters) being inspected, wherewith said sensor generates, by triangulation, a spatial coordinate value of a coordinate of the surface of the article with respect to the triangulation sensor in the direction of the measuring light beam, which value is derived from the back-scattered light from the measuring light beam incident on the article, and a device to register the spatial coordinates of the triangulation sensor itself as it moves along the sensing path.

According to a further advantageous embodiment of the inventive apparatus, the sensing device has a beam-deflecting mirror disposed in the path of the measuring light beam, enabling said beam to be directed onto surface regions of the molded/formed article which would otherwise require a more complex sensing path. E.g., when the triangulation sensor is moved along mutually orthogonal linear coordinate axes in a horizontal plane, the sensing of vertical or nearly vertical surface regions of the molded/formed article is not good. The deflection of the measuring light beam remedies this drawback.

According to another feature of the invention, the deflecting mirror may be in the form of a rotary mirror, whereby an otherwise fixed sensing device provides a movement of the measuring light beam across the surface of the article at a speed proportional to the angular velocity of the rotary mirror; this arrangement is particularly well suited to sensing of curved surface regions.

According to a very effective embodiment of the inventive apparatus, the sensing device has an optical plate with parallel faces which is disposed in the path of the measuring light beam and is rotatable. Due to refraction of the measuring light beam when it enters the optical plate, and the complementary refraction upon exiting said plate, the exiting measuring light beam is displaced by a distance with respect to the entering beam, and is parallel to said entering beam, said displacement depending on the angle of inclination of the rotating plate, wherewith, if the sensing device is otherwise fixed, the measuring light beam is displaced back and forth at a speed corresponding to the angular velocity of the optical plate. In this way, by combining rotation of the plate and translation of the sensing device, one can very rapidly scan edges or cracks in the surface of the article.

Another advantageous embodiment is characterized in that the sensing device has a rotary optical polygon having at least two parallel surfaces and at least one other mirrored surface. In the rotational positions of the polygon wherein the measuring light beam enters the polygon at one of the parallel surfaces and exits at the opposite parallel surface, the exiting measuring light beam will execute a linear back and forth shift movement, whereas in the rotational positions wherein the beam strikes the mirrored surface it will be deflected at a speed proportional to the angular velocity of the rotary polygon. If the sensing device is otherwise fixed, the mere rotation of said polygon gives rise to both a back-and-forth sensing sweep of the light beam and a deflected movement of said beam.

It is also provided within the scope of the invention that the sensing device may be associated with a conveying device whereby the molded/formed articles are brought into a prescribed position relative to the sensing path. This appreciably simplifies the evaluation, because by taking account of the position of the article its own coordinate system may be brought into a prescribed advantageous relationship to the coordinate system of the sensing path. Otherwise a measuring process must be undertaken to detect and determine the position of the article with respect to the sensing path, and this tends to be less efficient.

In the manufacture of molded/formed articles from ceramic materials, loose material will often stick to the articles, leading to soiling as the articles are conveyed through the inspection apparatus. In order to avoid soiling of the sensing device, it is advantageous if the sensing path of the triangulation sensor is disposed above and/or laterally of the molded/formed article positioned in the predetermined relative position, and if potentiometric contact sensors are provided for sensing the underside of the article. Such potentiometric sensors are less sensitive to falling pulverulent or granular material.

It is also provided within the scope of the invention that a lifting device is associated with the conveying device, wherewith said lifting device can engage the articles at a number of engaging locations and lift the articles above the conveyor and into their prescribed relative positions with respect to the sensing device. The lifting device enables very accurate adjustment of said relative positions, wherewith means of such accurate positioning are not needed as part of the conveying device itself. E.g., the conveyor may be in the form of a belt- or chain conveyor, and the lifting device may have upright standards which extend through the chain or belt elements in a comb-like configuration, wherewith when said standards are raised the article is lifted above the conveying device and is accurately positioned. After completion of the inspection, the upright standards are lowered again, whereby the molded/formed article is deposited on the conveying device to be conveyed away.

In this connection, the invention also provides that the lifting device may be coupled to a weighing device. In this way, the article can be weighed during the inspection, and its actual density can be calculated based on the actual volume determined by the sensing measurements. As a result, a determination can also be made of the extent to which the density of the articles varies from article to article. If the weighing device comprises more than one weighing cell, it is possible to also gain information about variations of density within a given article, and the distribution of mass over the volume of the article.

According to another feature of the invention, in the inventive apparatus the evaluation system has a data storage device for information characterizing the desired form of the articles, which information may include tolerances applicable to at least one of the dimensional parameters of said desired form, and the definition(s) of the sensing path(s) used in determining said parameter(s). This enables a pre-programming of desired forms and their associated tolerances. E.g. one may store the data concerning the desired forms of a wedge-shaped refractory piece, a curved ladle brick, and other articles. Thereby the apparatus is available to interchangeably inspect all of these articles.

In this connection it is particularly advantageous if the evaluation device has a visual display device for selective display of the data stored for each desired form. This gives the operator ready access to the apparatus settings relating to a given desired form—the settings chosen and the universe of optional settings available.

Ready availability of information to the operator and ease of operation are further enhanced, according to a refinement of the inventive apparatus, if the sensing path defined by the stored data can be graphically displayed on the display device. In this way the operator can be continually advised of the manner in which the articles are being inspected by the currently selected desired-form program.

An input device may also be provided for the evaluation device, whereby the memory device can be controlled in order to retrieve stored data and/or to change said data. In particular, the stored data concerning desired forms can be amended, and the apparatus can be adjusted in real time to the current production conditions. The input of amended data relating to the desired form of the article may be in the form of a calibration or standardization cycle wherein a model molded/formed article is sensed along a prescribed sensing path and the data therefrom are stored.

It is also advantageous if in the inventive apparatus an evaluation signal is generated from the result of comparing actual dimensional parameters and corresponding desired dimensional parameters, which evaluation signal characterizes the quality of the article, e.g. whether the deviations of the actual parameters from the desired parameters are within prescribed tolerances. Also, the evaluation signal may embody additional logical information, e.g. a conclusion as to whether the article is usable or not.

In this connection, it is advantageous if the evaluation signal is displayed on a visual display device. E.g., the evaluation signal, data on the desired form, and the tolerances can all be displayed on a video display terminal in easily surveyed form. Of course, one may standardize the format of such display screens, wherewith, e.g., for each article inspected a complete display is generated and printed-out or stored.

According to another feature of the invention, one may provide that a signal representing the result of a comparison can be used as a control signal for operating parameters of the forming machine which produces the articles being inspected. Such feedback coupling of the evaluation signal to the forming machine enables essentially immediate corrective measures to be introduced into the operating course of the forming machine in response to quality defects in the product. E.g., in the case of forming-presses, certain quality defects can be corrected by changing the material feed and the filling process for the forming cavity.

Additional features, details, and advantages of the invention will be apparent from the following description and the drawings, to which drawings express reference is made here as regards disclosure of any features illustrated which are essential to the invention and are not otherwise disclosed in the text.

DESCRIPTION OF THE PREFERRED EMBODIMENTS

Figure 1A:
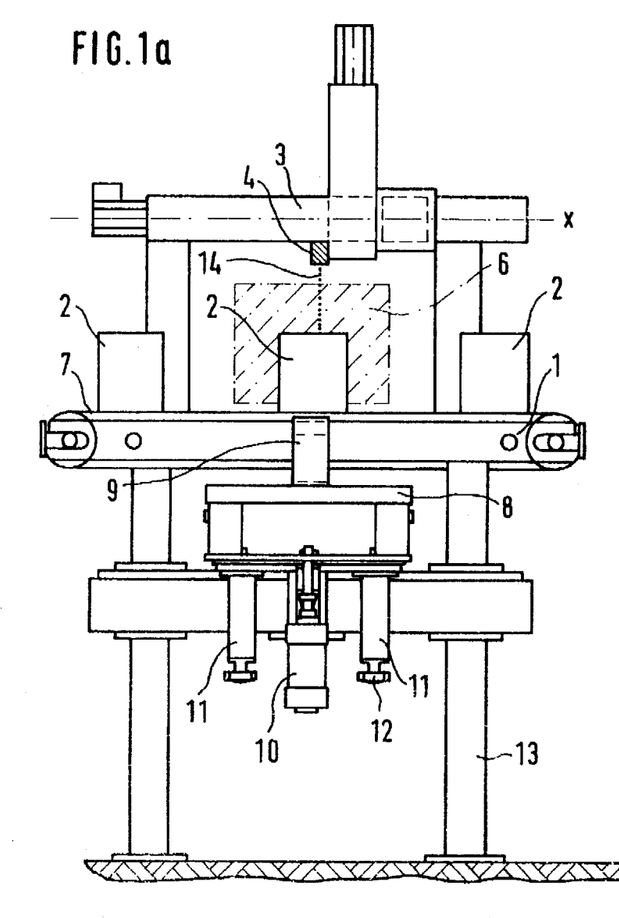
FIG. 1a is a schematic lateral view of a device for quality inspection, viewed transversely to the direction of conveyance of the formed/molded articles being inspected.
Figure 1B:
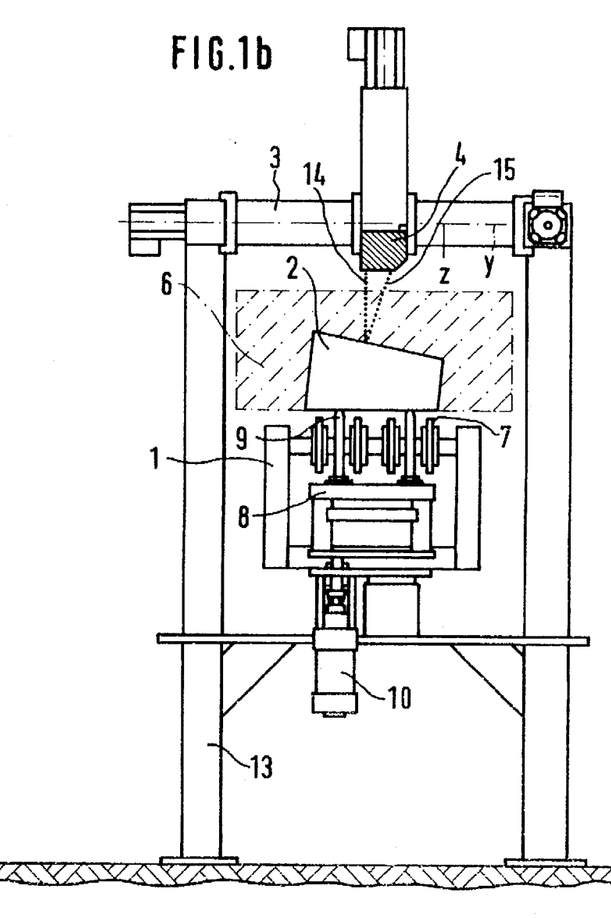
FIG. 1b is the device of FIG. 1a viewed in the conveying direction.

The device for quality inspection illustrated in FIGS. 1a and 1b in mutually orthogonal lateral views has a mechanical stage 3 disposed above a conveyor device 1 for the articles 2 being inspected. A triangulation sensor 4 is translationally movable on stage 3 along mutually orthogonal horizontal coordinate axes, the axis $\underline{x}$ lying in the plane of FIG. 1a and the axis $\underline{y}$ in the plane of FIG. 1b. By means of suitable control of its movement along the two coordinate axes (x, y), the triangulation sensor 4 can be moved along prescribed sensing paths 5 (see example of a path 5 in FIG. 2). A given sensing path 5 corresponds to sensing occurring within an inspection region 6 within the sensing range of the sensor 4, in which region the articles 2 can be inspected for shape deviations.

In the exemplary embodiment illustrated, the conveyor device 1 is in the form of a stepwise-movable conveyor belt having a plurality of endless belt elements 7 disposed a mutual distance apart. The articles 2 rest on the belt elements and thereby are transported into a prescribed position relative to the sensing path 5 of the triangulation sensor 4. A lifting table 8 disposed under the conveyor belt elements 7 has vertical support standards 9 disposed in a comb-like array (although only two are shown) extending between said elements 7. In the lowered position of the table 8, the vertical standards 9 are entirely below the conveying plane of the belt elements 7, but in the raised position of the table the standards 9 extend above the conveying plane, thereby engaging the underside of the article 2 resting on the conveyor, and lifting said article vertically above the conveyor elements 7. Thus the lifting table 8 with the standards 9 extending from it serves as a lifting device which can accurately adjust the vertical position of the molded/formed articles 2 with respect to the triangulation sensor 4. The vertical positioning of the table 8 itself between the uppermost and lowermost position of the table's excursion is accomplished by a cylinder-and-plunger device 10 accompanied by guide means 11 disposed parallel to the plunger movement, provided with excursion-limiting detents 12. The lifting components (8, 9) are supported on a machine frame 13 which also supports the stage 3.

As illustrated in FIG. 1b, the triangulation sensor 4 emits a measuring beam of light 14, e.g. an IR laser beam, the back-scattering 15 of which from the surface of the molded/ formed article 2 is detected by a suitable optical system in the triangulation sensor 4. The vertical position coordinate $\underline{z}$ of the back-scattering surface part of the article 2 is calculated from the measuring beam 14 and the back-scattered light 15 detected by the optical system of the triangulation sensor 4, by the well-known triangulation method. Combined with the horizontal coordinates (x, y) of the triangulation sensor 4 in its movement along the sensing path 5, in this way the spatial position of each inspected surface location of the article 2 is registered.

Figure 2:
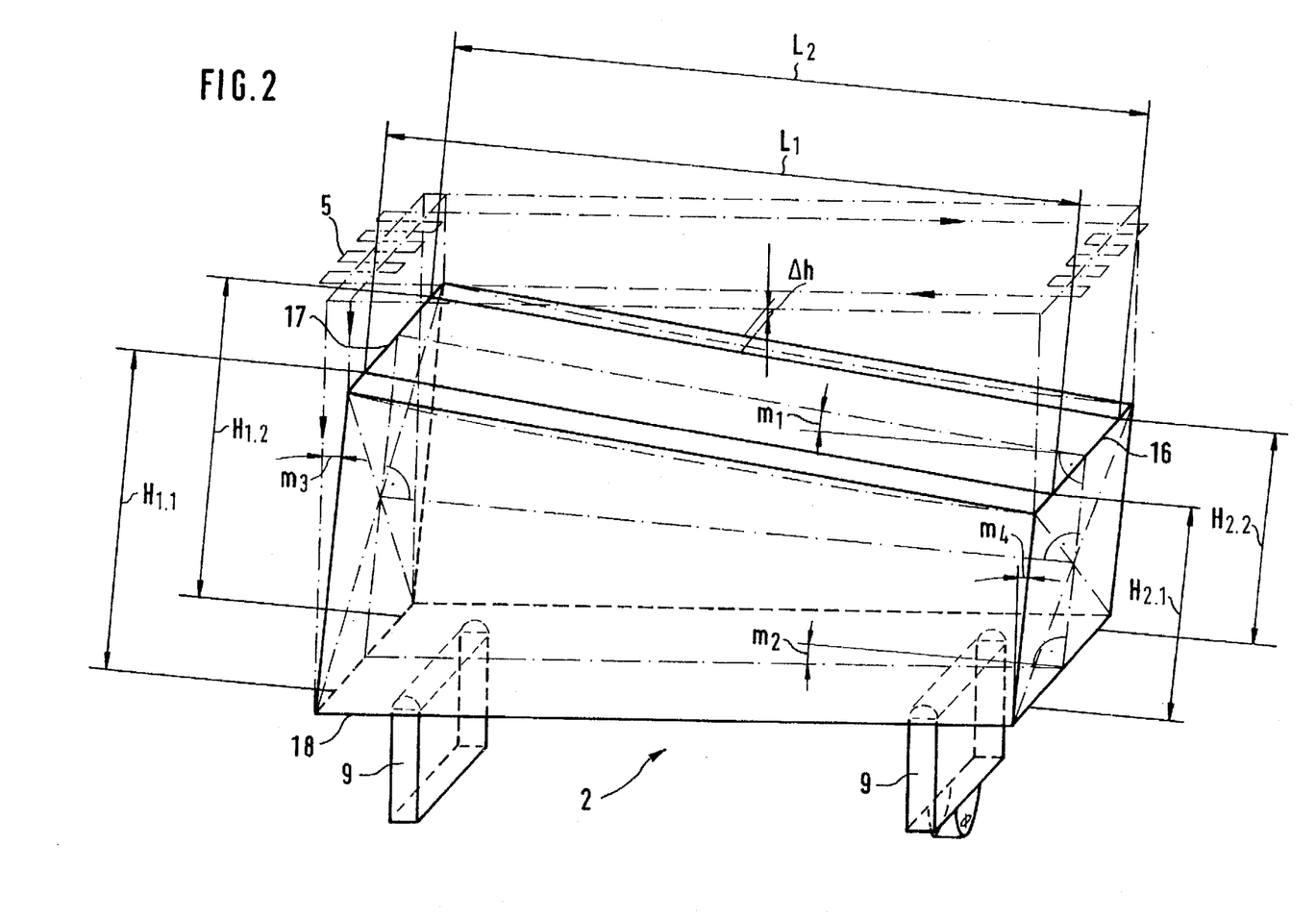
FIG. 2 is a schematic perspective drawing of a molded/formed article with dimensions which are to be inspected, showing the sensing path of a triangulation sensor which path is traversed during the inspection.

An example of a molded/formed article 2 resting on the vertical standards 9 is illustrated in FIG. 2. It is a press-formed ceramic refractory piece which is intended to be in the form of a truncated wedge. The desired form can be defined by the length L in the direction of the acute-angularly converging edges, the heights (H1, H2) of the major and minor wedge bases, and the angular deviations (m1, m2) of the wedge surfaces from the horizontal. To inspect the actual form in relation to the thus-defined desired form, the triangulation sensor 4 may be moved, e.g., through the sensing path 5 shown in FIG. 2, wherewith the measuring beam 14 is moved numerous times back and forth transversely over the edges (16, 17, 18) of the article 2 which are to be measured.

The sudden change in the coordinate $\underline{z}$ measured by the triangulation sensor 4 provides a very accurate pinpointing of the spatial position of the edges (16, 17, 18) in the direction of the measuring beam 14 as the beam passes over the respective edge. Each passage of the beam over one of the edges (16, 17, 18) provides a measurement of a point on said edge, wherewith the course of the edge is determined to the desired accuracy (the accuracy depending also on the density of the path 5, i.e. the number of measuring points per unit length of the edge). The actual lengths (L1, L2, . . . ) which are to be compared to the desired length L are then determined from the differences in the coordinates of the edges 17 and 16. Further, differences between edges 17 and 30 yield the actual heights H1.1 and H1.2 which are to be compared with the actual height H1. Also the differences between lines 17 and 30 enable determination of the angle m3. The same applies to the determination of angles m1 and m2, by determining differences in distances between lines 17 and 16, and between lines 30 and 31.

Figure 4:
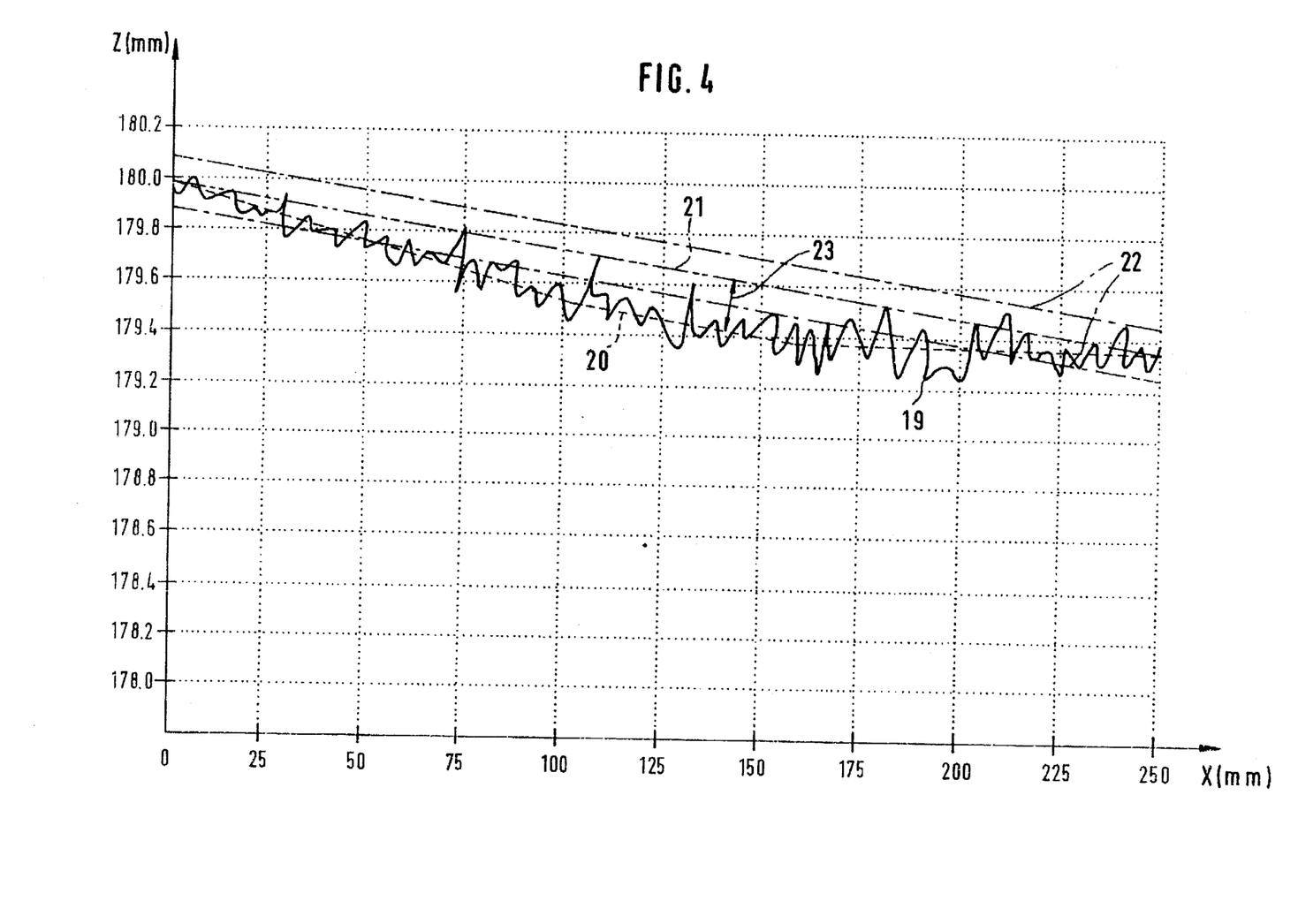
FIG. 4 is an example of measurements provided by the triangulation sensor, and the evaluation of same.

Also the features and course of the surface regions of the article 2 limited by the edges 16, 17, 18 and 32 can be determined by suitable choice of the sensing path 5, to the accuracy desired. E.g., in FIG. 4 an example is shown of the z-coordinate values provided by the triangulation sensor 4 as the measuring beam passes over the upper wedge surface of the article 2 which surface faces the sensor 4, said passage being in a path along the x-axis of the triangulation sensor 4 parallel to the plane of the drawing in FIG. 2). The reference numeral 19 designates the curve of the measured values of the z-coordinate provided by triangulation, serving as the measurements of the actual values for the article being inspected. Using computing means provided in an evaluation unit in the apparatus, a best-fit curve 20 is generated, e.g. in the form of a fitted polygon. This curve 20 enables a comparison with the desired lines 21 prescribed by the desired shape. A range of tolerance values 22 can be associated with the desired lines 21 which represent the desired shape, wherewith the deviation of the actual shape from the desired shape is deemed unobjectionable as long as the measured values of curve 19 are within the region (22, 22) describing the tolerance range. In FIG. 4 the best-fit curve 20 also has deviations well outside the tolerance region 22. In this instance the deviation will be evaluated as a bulge in the inspected surface region.

One may, e.g., define the maximum distance between the desired lines 21 and the best-fit curve 20 as the maximum bulge (or sag), 23. It is seen also that other "actual" dimensional parameters for comparison with corresponding desired values can be derived from the measured values 19, e.g. the mean surface roughness.

Figure 3:
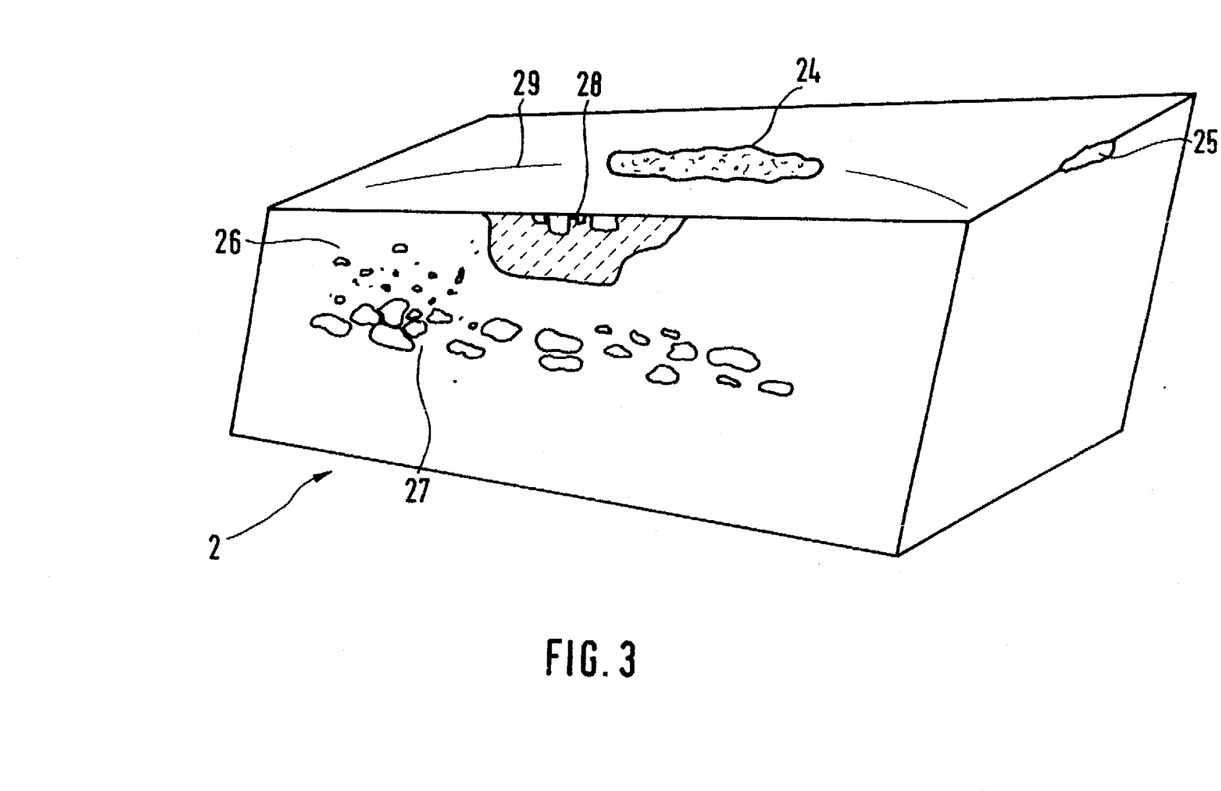
FIG. 3 is an illustration of various examples of shape deviations of a molded/formed article.

FIG. 3 shows other examples of surface- and edge defects which can be determined by the described method. Shown is a press-molded ceramic refractory article having a truncated wedge shape. On its upwardly directed wedge surface is a depression 24 created by adhesion of molding compound to the mold in the molding press. An edge depression 25 due to breakage is present on the edge between the upper wedge surface and the larger base surface. Isolated zones 26 of particularly fine material and isolated zones 27 of coarse material are shown on the lateral surface of the article facing the observer of FIG. 3. A surface region 28 having a granular relief is visible on the lateral edge facing the observer, in the region of the edge of the upper wedge surface which edge is nearest to the observer of FIG. 3. Further, the bulge discussed supra in connection with FIG. 4 is illustrated by the line 29. A bulge of this type is designated delta-h in FIG. 2.

The sensing path 5 shown in FIG. 2, through which path the movements of the triangulation sensor 4 are merely horizontal movements (in a single horizontal plane) over the article 2 in the coordinate axes $\underline{x}$ and $\underline{y}$ determined by the stage 3, has the advantage that the triangulation sensor 4 cannot be fouled by loose material which adheres to the article 2 and is dislodged during the inspection. On the other hand, it is not possible to directly inspect the underside (lower wedge surface) of the article 2 which rests on the vertical standards 9 and faces away from the measuring path 5. In order to be able to completely inspect this underside, one may dispose potentiometric contact sensors (not illustrated) in the inspection region 6, between the conveyor belt elements 7 and the standards 9. These sensors sensorially engage the underside, whereby signals providing measurement data on the actual configuration of the underside can be produced. Potentiometric contact sensors are distinguished by robustness and relative non-susceptibility to soiling by dislodged loose material.

The triangulation sensor 4 may also have a beam-deflecting mirror (not shown) positioned in the path of the measuring light beam 14. This enables sensing of surface regions of the article 2 which are not essentially accessible to (i.e. generally do not face) the measuring light beam 14 as originally directed. The deflecting mirror may be in the form of a rotary mirror, wherewith a sensing beam which scans at a high speed in the plane of the rotation can be generated. Another possibility is to dispose a rotatable optical plate with parallel faces (not shown) in the path of the measuring light beam 14. As a result of the dual refraction of the beam 14 (upon entry to the plate and upon exit therefrom), the exiting beam is parallel to the entering beam but is displaced therefrom by a distance which corresponds to the angular inclination of the plate; thus, the rotation of the plate results in a rapid reciprocating scan by the sensing beam, which is particularly convenient for rapid determination of edge regions.

Further, the functions of the rotary mirror and the optical plate can be combined, by disposing a rotary polygonal piece in the path of the measuring light beam 14, which polygon has at least two mutually parallel planar surfaces and at least one additional surface which is a mirror surface. The two parallel surfaces function the same as the above-mentioned optical plate, and the mirror surface provides the above-described function of a rotary mirror.

The lifting table 8 may be coupled to a weighing device (not shown), such that when the table 8 is raised and the molded/formed article 2 rests on the upright standards 9 in the inspection region 6, the weight forces exerted by the article 2 are transmitted to the weighing device which then generates a signal corresponding to the weight of the article 2. If the weighing device comprises a plurality of weighing cells, the weight force components deriving from various locations on the article 2 can be determined individually. In this way, the center of gravity of the article 2 can be determined, and conclusions can be drawn concerning the distribution of density inside the article 2.

Figure 5:
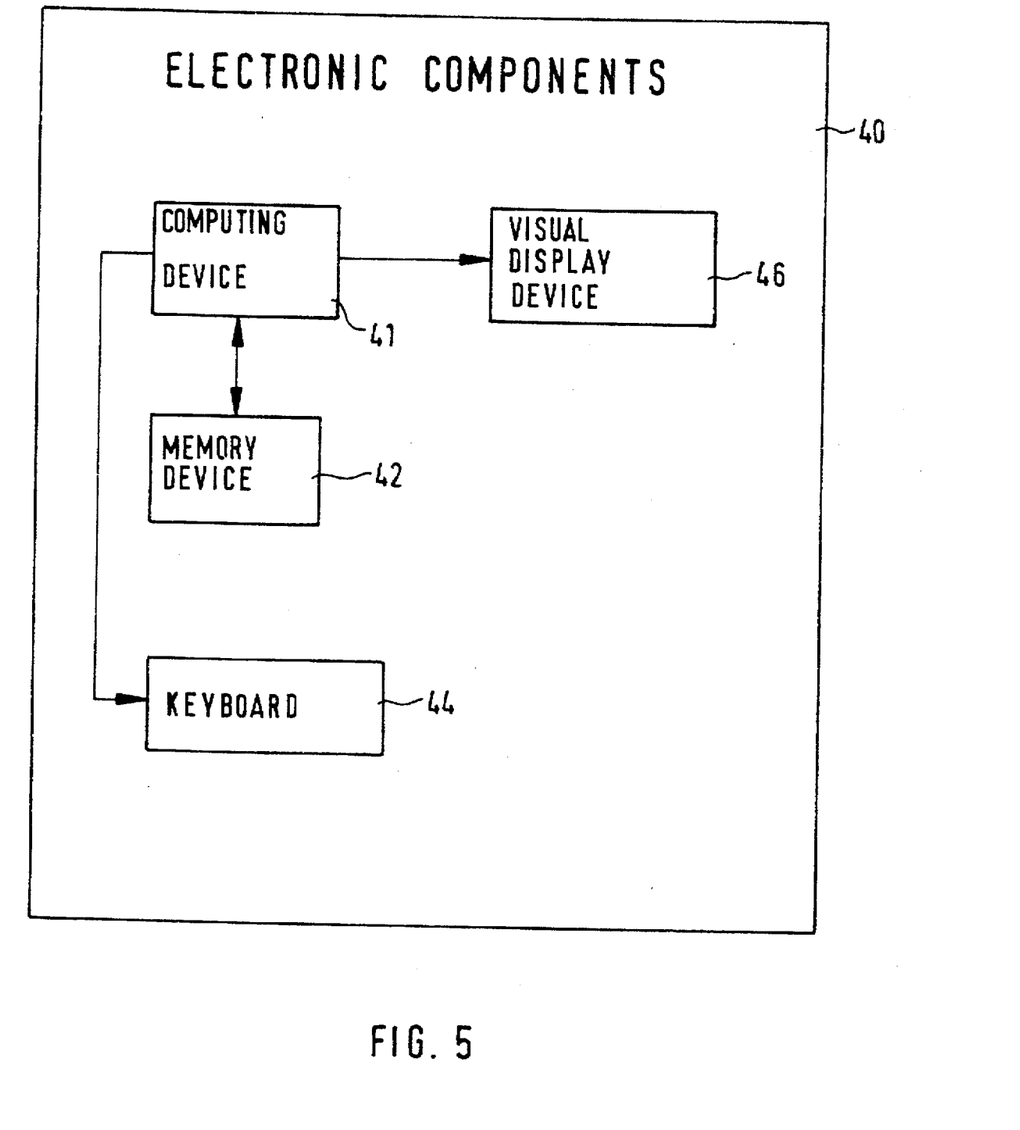
FIG. 5 is a block diagram schematically illustrating electronic components in accordance with a preferred embodiment of the present invention.

The preceding description discloses that the described apparatus and the method by which it is operated involve the comparison of actual dimensional parameters of the actual form of the molded/formed articles 2 undergoing inspection with the corresponding parameters of the desired form, wherewith data signals corresponding to said parameters of the actual and desired forms are processed in an automated comparison process, with subsequent automated evaluation of the quality of the articles 2. The evaluation device of the apparatus has appropriate electronic components 40 including, for example, a computing device 41 for performing the associated signal- and data processing. These electronics 40 may be disposed in a housing (not shown) mounted on the machine frame 13, or may be disposed separately. Such electronics 40 further comprise in particular a memory device 42 for data defining the desired form, certain dimensional parameters of the desired form, the tolerances associated with said parameters, and the sensing path provided for the desired form. The memory device 42 may hold a number of such data sets for various desired forms. The data on the desired form for a given type of article undergoing inspection can be retrieved via an input device, such as a keyboard 44. The keyboard 44 can also be used to retrieve data corresponding to a setting mode of the apparatus, wherewith a new data set can be entered or the present set can be amended.

The evaluation device may also be supplied with a display device 46, e.g. a video display terminal, wherewith when a stored data set for a given desired article form is retrieved it is displayed on the video screen as such or as a graphic display. In particular, one may provide a graphic display of the sensing path described by the data.

An evaluation signal generated in the evaluation device based on the comparison between actual dimensional parameters and dimensional parameters of the desired form can also be displayed graphically on the display device 46. Depending on whether the prescribed tolerances have been exceeded, the evaluation signal may have, e.g., two logic levels, displayed as a message "good" or "bad". Further, the evaluation signal may be used for sorting of the articles 2 automatically after the quality testing has been completed and the articles have been conveyed out of the apparatus by means of the conveyor device 1.

A signal representing the result of comparison of the actual and desired form can be sent to the forming machine which produces the molded/formed articles 2, and can be used there to influence the operating parameters of the forming machine in such a way as to quickly counter the deviations from the desired form which have been determined.

It may be that the deviations of the actual dimensional parameters from the prescribed desired dimensional parameters fluctuate only statistically, or said deviations may indicate a systematic approach to (and beyond) the prescribed tolerance limits. The progressive deterioration in successively produced articles may be a consequence of, e.g., progressive wear on the wall of the forming cavity for the articles. Means of trend determination may be provided in the evaluation device, whereby progressive deviations of the actual dimensional parameters from the desired dimensional parameters can be continually determined and trends identified. Such trend identification can be used to identify the causes of the progressive deviations (e.g. continuing wall wear), whereby necessary corrective measures can be implemented.

We claim:

1. An apparatus for conducting quality inspection of molded or formed articles produced in a molding or forming machine, pursuant to a prescribed desired dimensional form, said apparatus comprising:

evaluation means for evaluating the quality of an article by comparing at least one actual dimensional parameter of the actual dimensional form of the article with a corresponding desired parameter of the desired form, said evaluation means including a device which provides a desired-data signal which represents the desired dimensional parameter; and a sensing device for sensing the molded or formed article, and for providing an actual-data signal representing an actual dimensional parameter corresponding to the desired dimensional parameter, said sensing device including at least one triangulation sensor which is movable along a sensing path which path is selectively chosen and depends on the desired dimensional form and the actual dimensional parameters to be inspected, wherein said triangulation sensor generates, by triangulation, a spatial coordinate value (z) of a position on a surface of said article with respect to the triangulation sensor in a direction defined by the propagation of a measuring light beam, said spatial coordinate value (z) being derived from a back-scattered light produced by the measuring light beam when incident on said article; and a register device for registering spatial coordinate values of the triangulation sensor as the triangulation sensor moves along the sensing path, said apparatus further comprising a conveyor device associated with the sensing device, for bringing the molded/formed articles into a prescribed position relative to the sensing path, a lifting device being associated with the conveyor device, for engaging the molded/formed articles at a plurality of locations on said articles and lifting said molded/formed articles above the conveyor device into said prescribed position relative to the sensor device, in which said quality inspection of said molded or formed article is conducted.

2. The apparatus according to claim 1, wherein the sensing path of the triangulation sensor is disposed above a bottom of the molded/formed articles when said molded/formed articles are positioned in the prescribed position relative to said sensing path; and wherein potentiometric contact sensors are provided for sensing an underside of the molded/formed articles.

3. The apparatus according to claim 1, wherein the lifting device is coupled to a weighing device.

4. The apparatus according to claim 3, wherein the evaluation means further comprises a calculation device for calculating the density of the molded/formed article from a weight provided by the weighing device and a volume of the desired dimensional form.

5. The apparatus according to claim 3, wherein the weighing device has a plurality of weighing cells so that the molded/formed article is supported at a plurality of locations on said article during weighing, and wherein the evaluation means includes a device for determining the center of gravity of the molded/formed article from weight signals delivered from the weighing cells.

6. The apparatus according to claim 1, wherein the evaluation means further comprises a memory device for storing data relating to the desired dimensional form and associated tolerance values for at least one dimensional parameter of the desired dimensional form, and for storing data which defines said sensing path associated with said desired dimensional form.

7. The apparatus according to claim 6, wherein the evaluation means further comprises a visual display device for selectively displaying stored data associated with the desired dimensional form.

8. The apparatus according to claim 7, wherein the sensing path defined by the stored data is displayed as a graphic on the visual display device.

9. The apparatus according to claim 6, wherein the evaluation means further comprises an input device from which the memory device is controlled to retrieve and amend data stored in the memory device.

10. The apparatus according to claim 6, wherein the evaluation means further comprises a trend-identifying device for detecting a progressive approach of at least one of the actual dimensional parameters to at least one respective tolerance limit in successively inspected molded/formed articles.

11. The apparatus according to claim 1, wherein the evaluation means further comprises a computing device for determining a best-fit curve using surface coordinates of the actual dimensional form, said surface coordinates being determined from the spatial coordinate values (x, y) of the triangulation sensor and spatial coordinate values (z) of positions on at least one surface of said article in the direction of propagation of the measuring light beam, wherein said best-fit curve is used to define the value of an actual dimensional parameter.

12. The apparatus according to claim 1, wherein the evaluation means generates an evaluation signal which represents the quality of the molded/formed article and is based on a comparison between an actual dimensional parameter and a desired dimensional parameter.

13. The apparatus according to claim 12, wherein the evaluation signal is displayed on a visual display device.

14. The apparatus according to claim 12, wherein a comparison signal representing results of the comparison is applied as a control signal for operating-parameters of the forming machine which produces the molded/formed articles.

* * * * *